United States Patent
Kalenborn

(10) Patent No.: US 10,197,027 B2
(45) Date of Patent: Feb. 5, 2019

(54) DUAL FUEL INJECTOR

(71) Applicant: L'ORANGE GMBH, Stuttgart (DE)

(72) Inventor: Markus Kalenborn, Dornstadt (DE)

(73) Assignee: L'Orange GMBH, Stuttgart (DE)

( * ) Notice: Subject to any disclaimer, the term of this patent is extended or adjusted under 35 U.S.C. 154(b) by 86 days.

(21) Appl. No.: 15/485,310

(22) Filed: Apr. 12, 2017

(65) Prior Publication Data
US 2017/0218897 A1    Aug. 3, 2017

Related U.S. Application Data

(63) Continuation-in-part of application No. PCT/EP2015/002044, filed on Oct. 15, 2015.

(30) Foreign Application Priority Data

Nov. 17, 2014  (DE) .................. 10 2014 016 927

(51) Int. Cl.
*F02M 43/04*     (2006.01)
*F02M 45/08*     (2006.01)
(Continued)

(52) U.S. Cl.
CPC .......... *F02M 43/04* (2013.01); *F02D 19/0678* (2013.01); *F02D 19/0692* (2013.01); *F02D 19/0694* (2013.01); *F02M 37/0064* (2013.01); *F02M 45/086* (2013.01); *F02M 63/0005* (2013.01); *F02D 19/0613* (2013.01); *F02D 19/0647* (2013.01); *F02D 19/0689* (2013.01); *Y02T 10/36* (2013.01)

(58) Field of Classification Search
CPC .. F02M 43/04; F02M 21/0248; F02M 45/086; F02M 63/0003; F02M 63/0005; F02M 37/0064; F02D 19/0694; F02D 19/0605; F02D 19/061; F02D 19/0613; F02D 19/0639; F02D 19/0642; F02D 19/0647; F02D 19/0663; F02D 19/0676; F02D 19/0678; F02D 19/0689; F02D 19/0692
See application file for complete search history.

(56) References Cited

U.S. PATENT DOCUMENTS

| 6,298,833 B1 | 10/2001 | Douville |
| 2011/0232601 A1* | 9/2011 | Kim .................... F02D 41/3836 123/295 |

(Continued)

FOREIGN PATENT DOCUMENTS

| DE | 10 2013 000048 B3 | 6/2014 |
| WO | 2012/072881 A1 | 6/2012 |

*Primary Examiner* — Hung Q Nguyen
*Assistant Examiner* — Mark L Greene
(74) *Attorney, Agent, or Firm* — Fish & Richardson P.C.

(57) ABSTRACT

In a dual-fuel fuel injector comprising a first injector unit for a first injector operating mode using a first main fuel and a second injector unit for a second injector operating mode using a second main fuel and an injector-reservoir, the reservoir is connected at one end to a first main fuel supply and at the opposite end to a second main fuel supply with a separating element disposed in the injector reservoir so as to be movable between the opposite ends so that, in each operating mode, the full volume of the reservoir can be used for accommodating the respective main fuel.

15 Claims, 3 Drawing Sheets

(51) Int. Cl.
*F02M 37/00* (2006.01)
*F02M 63/00* (2006.01)
*F02D 19/06* (2006.01)

(56) References Cited

U.S. PATENT DOCUMENTS

| | | |
|---|---|---|
| 2013/0048750 A1 | 2/2013 | Hoisan |
| 2013/0247875 A1* | 9/2013 | Jay .................. F02M 43/04 123/447 |
| 2014/0091159 A1* | 4/2014 | Brown ................ F02M 63/00 239/398 |
| 2017/0002780 A1* | 1/2017 | Kalenborn ......... F02M 63/0045 |
| 2017/0030311 A1* | 2/2017 | Kalenborn ......... F02D 19/0681 |

* cited by examiner

DUAL FUEL INJECTOR

This is a Continuation-In-Part application of pending international patent application PCT/EP2015/002044 filed 2015 Oct. 15 and claiming the priority of German patent application 10 2014 016 927.8 filed 2014 Nov. 17.

BACKGROUND OF THE INVENTION

The present invention concerns a dual-fuel fuel injector including a first injector unit for a first operating mode using a first main fuel and a second injector unit for a second operating mode using a second main fuel wherein the injector includes an injector reservoir.

In connection with the use of dual-fuel fuel injectors, in particular in large motors, there is always the question of how to arrange on the injector in addition to a storage volume for liquid fuel also a large storage volume for gaseous fuel in taking into consideration the respective installation conditions in particular since each may be an individual high pressure reservoir. Large gas reservoir volumes are advantageous in order to keep a pressure loss during the gas injection process low, in particular because of the large pressure differential change between gas and combustion chamber pressure occurring during the compression stroke, it is difficult enough to inject the desired gas volume into the combustion chamber.

If it is constructively impossible to incorporate the gas and liquid fuel reservoirs required for a 100% engine load into an injector compromises must be accepted regarding the sizes of the reservoirs. With a motor which is designed for gaseous fuel operation as well as for liquid fuel operation, those consequences must be accepted either for both types of operation or—to a much larger extent—in connection with only one type of operation. This however may result in a particular mode of operation with limited power output.

Based hereon, it is the object of the present invention to provide a dual-fuel fuel injector which is suitable to provide the required reservoir needs with only relatively small space requirements.

SUMMARY OF THE INVENTION

In a dual-fuel fuel injector comprising a first injector unit for a first injector operating mode using a first main fuel and a second injector operating mode using a second main fuel and also an injector reservoir, the reservoir is connected at one end to a first main fuel supply and at the opposite end to a second main fuel supply with a separating element movably disposed in the injector reservoir between the opposite ends thereof so that, in each operating mode, the full volume of the reservoir can be used with for respective main fuel.

Such a dual-fuel fuel injector may be used in connection with a large motor for example for a transport vehicle such as a ship, a lock, a truck or another commercial vehicle or for stationary applications such as a city block heating installation, an emergency power generator or, in particular in connection with industrial applications.

The dual-fuel fuel injector comprises a first injector unit which is provided for a first injector operating mode (in particular an operating mode, in which the first injector unit is active, that is, ejects fuel, in particular an injection or blow-in operating mode) wherein a first (main) fuel is used.

The first injector unit is preferably used for an operation with gaseous fuel, that is, it is a gaseous fuel injector unit which is provided for a selective gaseous fuel injection.

The first injector operating mode is, in accordance with the invention, preferably an ignition jet operating mode, wherein gaseous fuel is injected (while also liquid fuel is injected as auxiliary fuel that is in particular via a second injector unit will be explained below). However, for example, also a pure gaseous fuel operation is feasible in the first operating mode with for example hydrogen as gaseous fuel. As gaseous fuel furthermore, natural gas, deposition gas, bio-gas or another gas may be provided. Generally, in the first injector operating mode however also a liquid fuel such as methanol may be provided as first main fuel for injection via the first injector unit.

In accordance with the present invention, the first injector unit is preferably a hydraulic servo-controlled injector unit, that is a nozzle valve of the first injection unit can be controlled in particular by a liquid control fluid and a servo-valve (pilot valve) can be selectively controlled to open. As the control fluid preferably the liquid fuel is used which is also used with the dual-fuel fuel injector.

The dual-fuel fuel injector further includes a second injector unit which is activated in a second injector operating mode (in particular an operating mode in which the second injector unit is activated, in particular an injection operating mode) with a second (main-) fuel, in particular, liquid fuel. The second injector unit is provided for the selective injection of liquid fuel.

The second injector operating mode is preferably an operating mode in which exclusively the second main fuel is injected via the dual-fuel fuel injector that is, respectively, the second injector unit, wherein, with the use of liquid fuel, preferably Diesel fuel, heavy oil or bio-oil is provided.

In connection with the present invention, the second injector unit, analog to the first injector unit, is preferably a hydraulic-servo-controlled injector unit, that is, a nozzle valve of the second injector unit can be controlled in particular by a liquid control fluid and a servo valve (pilot valve) to be selectively opened whereby the control fluid is preferably again the liquid fuel used in connection with the dual-fuel fuel injector.

The dual-fuel fuel injector further includes an injector reservoir that is respectively an injection pressure reservoir which is provided in particular in the form of an injector-individual reservoir provided on the injector. The injector reservoir is particularly provided to compensate for pressure variations occurring in the injection process, and, specifically to provide a storage volume for a high-pressure main fuel amount. To this end, the injector reservoir is connected to injector-internal (high pressure (HD)) fuel supply system.

In accordance with the invention, the dual-fuel fuel injector is characteristically further equipped to fill the injector reservoir depending on (that is, corresponding to) the respective (present or selected) injection operating mode (first or second injector operating mode) either with the first or the second main fuel. In this way, it is facilitated in accordance with the invention, the main fuel required for the respective operating mode can be store with a capacity required for full power output of the motor in only a single injector reservoir (universal high pressure reservoir). As a result, advantageously, the space requirements are very low.

Preferably, the dual-fuel fuel injector is designed to fill the injector reservoir during the first injector operating mode with the first main fuel—preferably gaseous fuel—and furthermore fill the injector reservoir during the second injector operating mode with the second main fuel—preferably liquid fuel. In this way, the respective main fuel can be provided for the respective injection or, respectively, injection operating mode as needed always from the injector reservoir, and additionally with a pulsation damping feature. To this end, preferably, for example, in the first injector Operating mode an injection nozzle of the first injection unit can be placed into communication with the injector reservoir, and the dual-fuel fuel injector may further be designed to place, in the second injector operating mode, the injection nozzle of the second injector unit in communication with the injector reservoir.

The proposed dual-fuel fuel injector is designed in particular also for a changeover of content of the injector reservoir, that is, for a displacement of one main fuel from the injector reservoir by means of the respective other main fuel, whereby the injector reservoir is filled with the respective other main fuel. A fuel change is provided for in connection with a switch-over or change between the injector operating modes (first and second injector operating mode).

With a transition or switch-over from the first injector operating mode to the second injector operating mode, consequently, the main fuel of the first injector operating mode is displaced from the injector reservoir and the injector reservoir is filled with the main fuel of the second injector operating mode. Equally, it is provided that, with a transition from the second injector operating mode to the first injector operating mode, the main fuel of the second injector operating mode is displaced from the injector reservoir and the injector reservoir is filled with the main fuel of the first injector operating mode.

Preferably, the injection reservoir is in the form of a cylinder-piston reservoir. The injector reservoir may have a first (reservoir) side with an inlet for the first main fuel and a second (reservoir) side with an inlet for the second main fuel. A separating element (piston, separating piston) may herein separate the first and second sides from each other. The separating element may be sealed slidably against the injector reservoir wall, for example via piston seal rings.

In preferred embodiments of the dual-fuel fuel injectors, the dual-fuel fuel injector is designed so that, in the first injector operating mode, the inlet of the injector reservoir for the first main fuel is in communication with a first high pressure supply line of the dual-fuel fuel injector, which high pressure supply line is furthermore in communication with the nozzle volume of the first injector unit.

Herein, the dual-fuel fuel injector is preferably also designed so as to be capable of establishing for the second injector operating mode a second high pressure supply communication path from the inlet of the injector reservoir for the second main fuel to the dual-fuel fuel injectors. The second high pressure supply path is furthermore in communication with a nozzle volume of the second liquid fuel injector unit. With such an arrangement, a respective reservoir can be filled via a respective high pressure supply path (of a respective main fuel) in a simple manner or, respectively, the reservoir content can be changed.

For a displacement of fuel—for example a filling change to the respective other main fuel—the dual-fuel fuel injector is preferably so designed that, for the first injector operating mode, the fuel can be released from the second side of the injector reservoir and the fuel can be released from the first side of the injector reservoir for the second injector operating mode. During the release of fuel from a respective side, the main fuel is pushed out respective reservoir side by pressurizing or, respectively, filling the other injector reservoir side with the other fuel. Preferably, the main fuel is displaced in each case by means of the separating element and preferably pushed out through the inlet of the side of the reservoir in which the fuel to be displaced is disposed.

In order to supply selectively the first or the second main fuel to the injector reservoir, the dual-fuel fuel injector may include a switch-over control arrangement in particular for an actively controlled switchover in connection with an operating mode change. Such a switchover control arrangement may include, in particular, a pressure-controlled valve and for example a (controllably operable) shut-off valve.

As an alternative of an active switch-over capability, the dual-fuel fuel injector may also be provided with a passive switch-over arrangement for example in such a way that the injector reservoir is filled pressure-controlled depending on the respective injector operating mode with the first or the second main fuel. In particular, it may be exclusively pressure controlled (preferably via the respective fuel supply pressure level of the first and the second main fuel).

With the present invention, also a dual-fuel fuel injection system is proposed which includes a dual-fuel fuel injector as described above, in particular a plurality of such injectors. The dual-fuel fuel injection system is preferably installed for controlling the refilling or switch-over of the injector reservoir during a changeover of operating modes, that is between the first and the second injector operating mode.

In a preferred embodiment of the dual-fuel fuel injection system wherein the dual-fuel fuel injector includes a switchover control arrangement as described above, the dual-fuel fuel injection system is designed for controlling the switchover arrangement of the dual-fuel fuel injector in order to fill the injector reservoir either with the first or the second main fuel depending on the desired injector operating mode which is to be activated. With such a solution, it may be provided that a valve of the switch-over arrangement is controllable by a control unit of the fuel injection system.

Alternatively, and in particular, in accordance with solutions of the dual-fuel fuel injectors with which a passive or, respectively, pressure-controlled switch-over is provided for, the dual-fuel fuel injection system is designed to fill the injector reservoir in accordance with a provided injector operating mode pressure-controlled either with the first or the second main fuel. To this end, the dual-fuel fuel injection system may establish for the first main fuels certain supply pressure levels, in particular by means of a suitable control of the dual-fuel fuel injection system at the dual fuel injector (at the fuel inlets).

In connection with the invention, the dual-fuel fuel injection system may maintain the motor-load-dependent energy amount needed for the injection events during a switch-over between the operating modes essentially constant by means of a transition strategy. With such a strategy, for a number of injection events occurring during a switch-over between the injector operating modes, that is, a change of the reservoir fillings, an injection amount of the one main fuel which may be less than the desired amount may be compensated for by an increase in the amount of the other main fuel or by an extended injection duration.

The invention further relates to a combustion engine with a dual-fuel fuel injector and/or a dual-fuel fuel injection system as described above. Also, a method is described which can be performed with the dual-fuel fuel injector in an advantageous manner.

Further features and advantages of the invention will become apparent from the following description of exemplary embodiments of the invention with reference to the accompanying drawings, which show essential features, and also from the claims. The various features may be embodied individually or in any combination in a particular variant of the invention.

Preferred embodiments of the invention will be described in greater detail below on the basis of the accompanying drawings.

BRIEF DESCRIPTION OF THE DRAWINGS

It is shown in.

DETAILED DESCRIPTION OF PARTICULAR EMBODIMENTS

Figure 1:
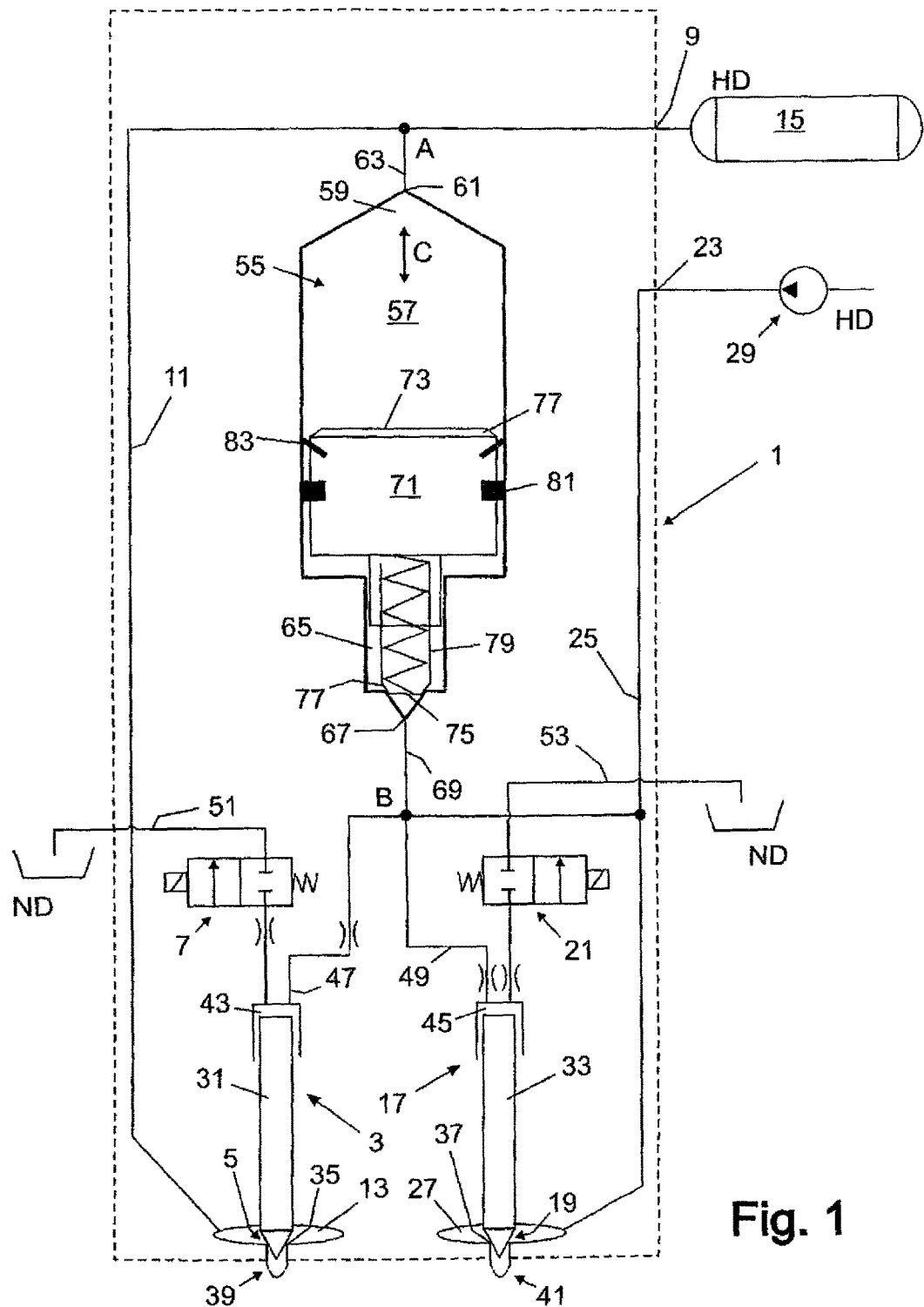
FIG. 1, in an exemplary and schematic way, a structure diagram of a dual-fuel fuel injector of a possible embodiment of the invention, FIG. 2, in an exemplary and schematic way a structure diagram of a dual-fuel fuel injector of a further possible embodiment of the invention, and FIG. 3, in an exemplary and schematic way a structure diagram of a dual-fuel fuel injector of a further possible embodiment of the invention still further.

FIG. 1 shows in an exemplary and schematic way a dual-fuel fuel injector (two-fuel nozzle or, respectively, two-fuel injector).

For the representation of a first injector operating mode (blow-in or, respectively, injection operating mode) which is provided with a first (main) fuel in the form of a gaseous fuel or respectively a combustible gas, the dual-fuel fuel injector 1 includes a first injector unit 3. The first injector unit 3 is hydraulically-servo controlled, that is, a nozzle valve 5 of the first injector unit 3 indirectly is controlled via a servo or respectively pilot valve 7 and a control fluid, that is, in a way known per se.

The combustible gas which may be for example natural gas is supplied via a gas inlet 9 of the dual-fuel fuel injector 1 and conducted via a first high-pressure supply path 11 to a nozzle volume or respectively gas-nozzle chamber 13 of, the first injector unit 3 (first nozzle volume 13). The first high-pressure supply path 11 extends therefore from the inlet 9 for the first main fuel or, respectively, the combustible gas fuel inlet 9 to the gas nozzle chamber 13. For supplying the first, in particular high-pressure, main fuel (for example at a pressure level of up to 400 bar) or, respectively, the combustible gas, a combustible gas store 15 for example in the form of a pressure tank may be connected to the inlet 9 and to a dual-fuel fuel injection arrangement used in connection with the dual-fuel fuel injector 1, preferably a common rail gaseous-fuel fuel injection arrangement or, respectively, a combustion engine.

The dual-fuel fuel injector 1 further comprises a second injector unit 17 for a second injector operating mode (particularly injection operating mode) with a second (main) fuel. The second main fuel is, in particular, a liquid fuel, preferably, Diesel fuel, heavy oil or bio-oil. Like the first injector unit 3, the second injector unit 17 is also hydraulically servo-controlled, that is, a nozzle valve 19 of the second injector unit 17 is indirectly controlled by means of another servo-or respectively pilot valve 21 of the first injector 1 and a control fluid, also in a way known per se.

The liquid fuel can be supplied via a further inlet 23 that is a liquid fuel inlet of the dual-fuel fuel injector 1 and a second high pressure supply path 25 to a nozzle volume 27 or, respectively, a liquid fuel nozzle chamber of the second injector unit 17. To this end, the second high pressure supply path 25 extends from the inlet 23 for the second main fuel, or respectively, the liquid fuel inlet to the nozzle volume 27 of the second injector unit 17. For supplying the second, in particular also highly pressurized, main fuel, that is; respectively, the liquid fuel (for example, up to 250 bar or more), the inlet 23 may be in communication with a supply arrangement 29 for example a common rail or a high, pressure generating device (a dual-fuel fuel injection arrangement used in connection with the dual-fuel fuel injector 1) which is provided to supply the second fuel to the inlet 23.

Below in a cursory way, the design of an injector unit 3, 17 is described.

The nozzle valve 5 or, respectively, 19 is formed by a nozzle needle 31 or, respectively, 33, which acts at its end near the nozzle against a nozzle valve seat 35 or, respectively, 37 where a flow passage staring from the nozzle volume 13 or respectively 27 extends to a nozzle arrangement 39 or respectively, 41 of the injector unit 3, 17 which is opened when the nozzle needle 31, 33 lifts off the nozzle seat 35, 37. For the selective opening control, a control chamber 43, 45 is formed at the end of a nozzle needle 31, 33, which is guided in an axial bore remote from the nozzle. The control chamber 43, 45 is pressurized by a high-pressure control fluid in the form of the second main fuel via a supply branch 47, 49 (including a flow throttle) whereby a force in closing direction of the nozzle needle 31, 33 is generated.

The control chamber 43, 45 is further provided with a discharge branch 51, 53 (provided with a throttle) for releasing pressure via a leakage flow path 51, 53 which includes a servo or pilot valve 7, 21 for discharging control fluid to the low pressure side ND. The servo valve 7, 21 is preferably a magnetically actuated valve as shown for example a 2/2 way valve which can be controlled by a control arrangement of a fuel injection arrangement provided with the dual-fuel fuel injector.

With this arrangement, a force can be applied to the nozzle needle 31, 33 by the high-pressure fuel in the nozzle chamber 13, 27 in its opening direction and by high-pressure fuel in the control chamber 43, 45 in the closing direction, (for example, additionally supported by a closing spring). For injection of fuel, the nozzle valve 5, 19 opens when there is no longer a closing force equilibrium at the nozzle needle 31, 33, that is as soon as a force in opening direction exceeds the force in closing direction, which can be achieved by opening the servo valve 7, 21. By opening the servo valve 7, 21, the fuel can flow out of the control chamber 43, 45 to the low pressure side ND whereby the pressure in the control chamber 43, 45 is reduced. Upon closing the servo valve 7, 21, the pressure in the control chamber is again build-up and the nozzle needle 31, 33 is returned to its seat (end of injection).

As further shown in FIG. 1, the dual-fuel fuel injector 1 includes an injector reservoir 55 which is a high-pressure reservoir. The injector reservoir 55 is shown as a single pressure reservoir or, respectively, an injector-individual reservoir for the injector 1, wherein the injector reservoir 55 includes a storage volume 57.

At a first reservoir side 59 for example a first main fuel side or respectively, combustible gas side, the injector reservoir 55 is provided with a first inlet 61 for the first main fuel (combustible gas inlet), which, via a first inlet branch 63 is in communication with the first high pressure supply path 11. The supply path 63 branches off the connection A and extends to the injection reservoir 55 so that the first side 59 of the reservoir 55 can be filled with the first main fuel via the inlet 61. At a second reservoir side 65, that is a second main fuel side or, respectively, liquid fuel side, the injector reservoir 55 includes a second inlet 67 for the second main fuel (liquid fuel inlet) which, via a second inlet branch 69, is in communication with the second high pressure supply path 25, that is, the inlet branch 69 extends from the connecting point B to the second inlet 67 so that the injector reservoir 55 or, respectively, the second reservoir side 65 can be filled with the second main fuel via the second inlet 67.

As further shown in FIG. 1, in the injector reservoir 55 or, respectively, the reservoir volume 57, a separating element 71 is arranged in particular in the form of a separating piston. The separating element 71 is arranged between the first reservoir side 59 of the injector reservoir 55 and the second reservoir side 65 of the injector reservoir 55. The separating element 71 is movable between a first and a second end position (in each case abutting), that is, in a slide direction C. The separating element 71 is shown in FIG. 1 in the second end position.

For sealing in the respective end position, the first inlet 61 and respectively the second inlet 67, that is, to block the respective inlets 61, 67, the separating element 71 is provided at, in the slide direction C opposite ends 73, 75, with a sealing profile 77, which is configured to cooperate with the injector reservoir 55 as sealing partner, that is, over a circumference. A first cross-sectional area or operating cross-section of the separating element 71 to which operating fluid can be supplied via the inlet 61 of the side 73 is larger than a second diameter or operating cross-section at the opposite second inlet 67 for supplying fluid to the side 75. In particular, the separating element 71 may include at the side 75 facing the inlet 67 a spring loaded valve rod 79 which provides for the sealing diameter 77, or, respectively, operating cross-section at the second end 75. To some extent, the separating element 71 disposed in the injector reservoir 55 acts as a valve adapted to selectively block the first inlet 61 or the second inlet 67.

As further shown in FIG. 1, the separating element 71 is sealed against the wall of the injector reservoir 55 by at least one piston seal ring 81. Further, additionally a stripper element 83 may be provided. In this way, an unintended overflow of a fuel from the first side 59 to the second side 65 and vice versa is largely prevented.

Such a dual-fuel fuel injector is in accordance with the present invention designed to permit filling of the injector reservoir 55 in accordance with the respective operating mode either with the first or the second main fuels. Herein the dual-fuel fuel injector 1 utilizes in the shown form a passive switch-over functionality which is initiated in particular by an external pressure control for the filling change-over.

This process will be described below in greater detail for the respective operating situations with for example a dual-fuel fuel injection arrangement or, respectively, a combustion engine.

In a second injector operating mode (not according to FIG. 1) with liquid fuel injection operation, for example during operation with Diesel fuel, the injector reservoir 55 is filled with the second main fuel that is a liquid fuel at the liquid fuel side 65 between the second inlet 67 and the separating piston 71. The separating piston 71 is in the first end position (combustible gas stop) and blocks the first inlet 61. In other words, the injector reservoir 55 is now filled only with the second main fuel.

For a switch-over from the second injector operating mode to the first injector operating mode, preferably ignition jet operation, and a filling of the injector reservoir 55 with the first main fuel (wherein the second main fuel is displaced from the injector reservoir 55, that is, the injector reservoir filling is changed) now a force relationship is reversed by pressure control in such a way that the force, to which the separating element 71 at the front surface 73 is exposed, becomes larger than the force, to which the separating element 71 is exposed at the liquid fuel side thereof (the piston surface 75).

To this end, the gas pressure is increased preferably to a maximum supply pressure (the combustible gas supply pressure at the combustible gas inlet 9 is for example 400 bar) whereas the liquid fuel supply pressure (hydraulic pressure at the liquid fuel inlet 23) is for a short period reduced to a value (slightly) below the combustible gas supply pressure (for example 350-380 bar). With such a hydraulic pressure level, the injection amount and the hydraulic control of the nozzle needles 31, 33 can be further ensured. The respective supply pressure levels for an injector reservoir filling change-over are adjusted herein preferably by a control of the dual-fuel fuel injection arrangement or, respectively, a combustion engine used in connection with the dual-fuel fuel injector.

As a result of the lower hydraulic pressure or, respectively, the corresponding pressure difference between the first inlet 61 and the second inlet 67, the separating element in the injector reservoir 55 is moved toward the second inlet 67 and closes the second inlet, so that the injector reservoir 55 is filled with combustible gas via the first inlet 61 at the first side 59 (between the first inlet 61 and the separating piston 71) while the liquid fuel is discharged by the separating element 71 via the second inlet 67.

Depending on the level of the engine load, during switch-over between the injector operating modes, for a short period during the transition, a liquid fuel combustible gas mixture operating strategy may be used for the operation of the combustion engine in order to avoid a load loss. Herein, preferably the combustible gas volume to be introduced is increased with each cycle (wherein also the gas volume of the injector reservoir is increased), while, at the same time, the liquid fuel injection amount is reduced.

Below, a switch-over from the first injector operating mode, that is a ignition jet operation with combustible gas as main fuel, to the second injector operation mode wherein the injector reservoir 55 is again filled with the first main fuel, that is liquid fuel, will be described below in greater detail.

In the first injector operating mode, the separating element 71 keeps the second inlet 67 reliably closed for example against a pressure of 600-1000 bar. This pressure range is generally large enough for liquid fuel injection in connection with the first injection operating mode (ignition jet operation).

If now, in connection, with a switchover of the operating mode, the pressure is increased in connection with the supply of liquid fuel, which exceeds a predetermined differential pressure threshold (alternatively also a gas pressure reduction may be provided), with the particular design of the dual-fuel fuel injector, the injector reservoir 55 is automatically filled with liquid fuel while the combustible gas is displaced from the fuel reservoir 55, that is, the combustible gas is pushed out of the injector reservoir 55 against the momentary constant supply pressure of the combustible gas via the first inlet 61. During the switch-over phase, the first injector unit 3 remains operative also with a continuously reduced combustible gas volume in the injector reservoir such that a switch-over of the injector operating mode poses no problem during idling or partial load operation.

Also, in this case, the use of a transition strategy may be provided wherein the liquid fuel injection may be adapted continuously from one cycle to the next (for example pre-controlled via a performance graph) so that it may be increased with a high engine load while the gaseous fuel amount injected is reduced in the following operating cycles.

Figure 2:
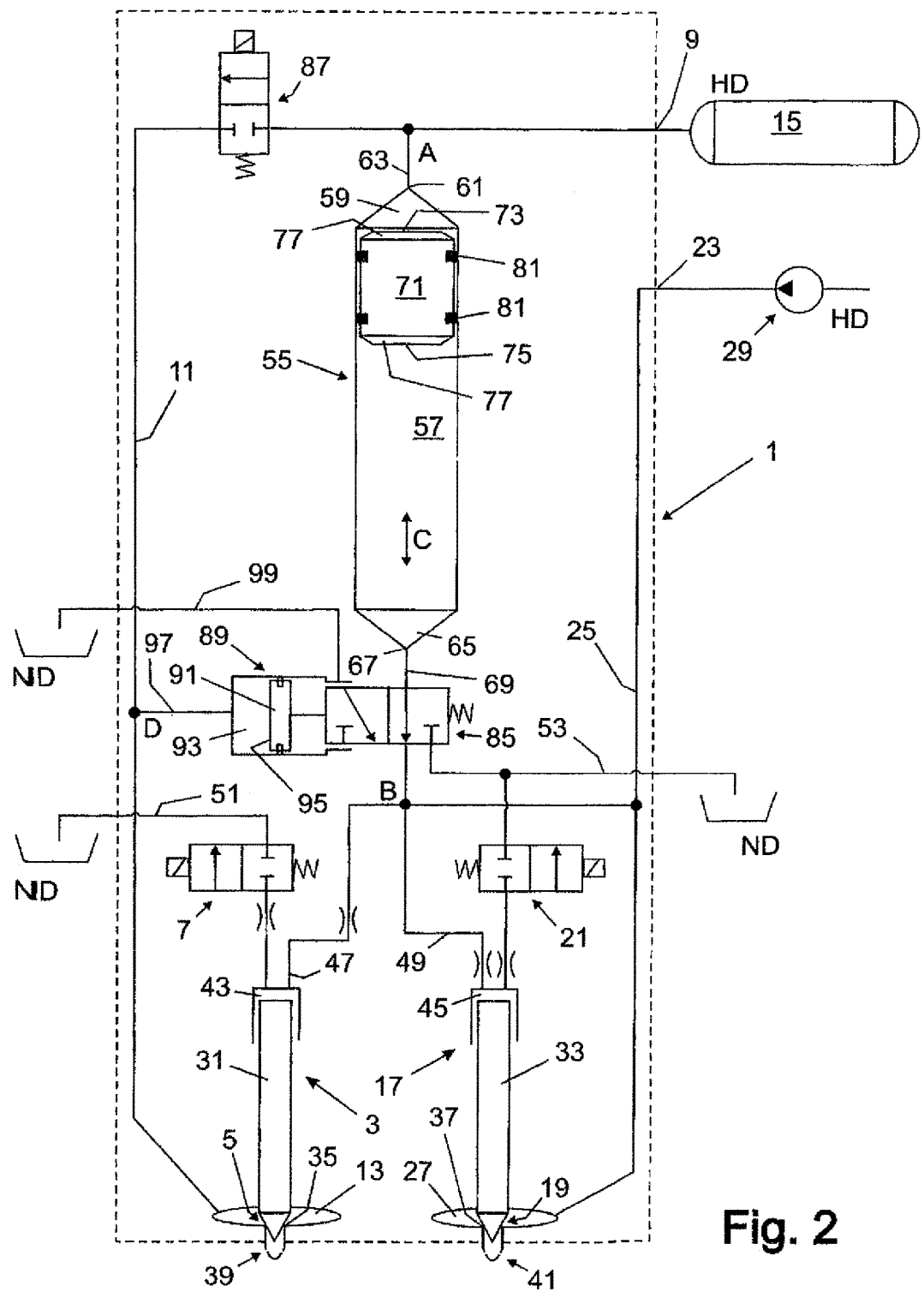

FIG. 2 shows schematically an exemplary dual-fuel fuel injector 1 in accordance with a preferred embodiment of the invention, wherein the filling of the reservoir can be actively switched over with a switch-over of the injector operating mode, to which end preferably a switch-over arrangement is provided. With the dual-fuel fuel injector 1 according to FIG. 2 a switch-over may be executed advantageously also during full-load operation of a combustion engine.

Like the dual-fuel fuel injector 1 described in connection with FIG. 1 also the dual-fuel fuel injector according to FIG. 2 includes an injector reservoir 55 which can be filled from two sides that is from the first side 59 or, respectively, combustible gas side as well as from the second side 65 or, respectively, the liquid fuel side. Also a separation element 71 is disposed in the injector reservoir 55 again in the form of a separating piston which is movable between a first and a second end position in a movement direction C and which has a blocking function in the respective end position.

To this end, the separating element has again circumferential sealing surface areas 77 at opposite ends 73, (in the movement direction) which cooperate with the injector reservoir 55 to provide for sealing in the respective end positions. Different from the embodiment of FIG. 1, the separating element or piston 71 however has an essentially uniform cross-section and is cylindrical so that also the opposite front surfaces 73, 75 which are pressurized via the respective inlets have the same diameter that is the same effective cross-section.

The separating element 71 again includes circumferential seal rings 81 whereby the separating element is movable slidably along the inner wall of the injector reservoir 55. In addition, a stripper element may be provided. Also in this embodiment, the separating element 71 acts in the inject or reservoir 55 as a valve which is capable to selectively block the first or the second inlet 61, 67.

Different from the embodiment described earlier, the dual-fuel fuel injector 1 further includes a switch-over control arrangement which is formed mainly by a pressure controlled valve 85 and a shut-off valve 87 which can be selectively opened.

The pressure controlled valve 85 is a 3/2 way valve (pneumatically controlled) arranged ahead of the inlet 67 of the injector reservoir 55 that is in the inlet flow branch 69 so that the second inlet opens dependent on the switch position of the valve 85. In a first (as shown) switching position, the pressure controlled valve 85 can switch the inlet 67 into communication with the second high pressure supply path 25 and in a further second switching position of the valve 85, the second inlet 67 is placed into communication with the low-pressure side ND that is via the connection B into communication with the leakage flow path 53. In the second switching position, the injector reservoir 55 can consequently be depressurized at the second side 65.

The pressure-controlled valve 85 preferably includes a piston actuating mechanism 89 including a piston 91 which is guided in an operating cylinder 93 wherein a switch-over from the first to the second switching position can be obtained by applying a pressure load to the piston 91 at a control side 95.

For control action, the cylinder chamber 93 is placed into communication with the high pressure path 11 via a flow connection 97 which branches off the high pressure path 11 between the blocking valve 87 and the first nozzle volume 13 at a connection D. When the pressure level in the cylinder operating chamber 93 at the control side exceeds a threshold value, the pressure-controlled valve 85 is switched by the piston 91 (from the first to the second switching position). When the pressure goes below the threshold valve the first switching position is again automatically assumed (by a spring load). The pressure-controlled valve may further be provided with a leakage return line 99.

As mentioned above already, the switch-over control arrangement may further include a shut-off valve 87 through which the first high pressure path 11 extends and via which the first high pressure path 11 can selectively be blocked. Preferably, the shut-off valve 87 is controlled for example by a control arrangement of a dual-fuel fuel injection system or a combustion engine.

The shut-off valve 87 is arranged downstream of the connection point A and upstream of the branch point D of the flow connection 97 of the pressure control valve 85 in the first high pressure supply path 11. Arranged in this way, the shut-off valve 87 in the first shown switching position (blocking position) blocks the high pressure supply path 11 of the connecting point A or, in a second switching position (flow position) permit passage through the valve 87.

With the dual-fuel fuel injector according to FIG. 2, a switch-over between the first and the second injector operating mode is possible like it is with the dual-fuel fuel injector 1 according to FIG. 1 and also with the motor in operation. In addition a switch-over in idle or under partial load, in particular also under full-load operation is possible. Switch-over procedures in which a filling change-over of the injector reservoir 55 is involved will be described below.

FIG. 2 shows a dual-fuel fuel injector 1 in the second injector operating mode, for example in a 100% Diesel full-load operation. The pilot valve 7 of the first injector unit 3 is in a blocking position. By the blocking valve 87, which is also in a blocking position, no pressure fluid is applied to the first injector unit 3, that is, the first high pressure supply path 11 interrupted. In the second high pressure supply path 25 an injection pressure of about 2500 bar is provided.

With a switch-over to the first injection operating mode (preferably ignition jet operation), the blocking valve 87 is opened by a change-over to the second switch position, in particular with a maximum gas pressure (of ca. 350-400 bar). As a result, a gas pressure of this level is also applied to the nozzle volume 13 of the first injector unit 3, in particular within one operating cycle. At the same time, the pneumatically controlled valve 85 interrupts by switchover to the first switching position, the liquid fuel supply to the second reservoir side 65 and furthermore connects the second reservoir side 65 to leakage return line so that there is no pressure in the second side (the second reservoir side 65 is emptied).

In this state, the separation piston 71 to which combustible gas pressure is applied pushes the liquid fuel via the inlet 67 into the (ND) leakage system of the dual-fuel fuel injector 1 (and in this way for example back into a tank). Upon reaching the second end position, that is, the end stop, the separating piston 71 closes the second inlet 67. Herein, the high pressure supply of the second injector unit 17 (control chamber 45 and nozzle volume 27) is maintained so that ignition fuel and partial load fuel amounts for combustible gas—or a mixed combustible gas-liquid fuel can further be injected.

Since, because of the change-over of the filling of the reservoir 55 or, respectively, the duration of its filling with combustible gas, the combustible gas is not immediately available at full capacity, an operation transition strategy is provided whereby a speed or load breakdown is avoided. In a preferred transition strategy, the overall energy equivalent to be injected is maintained essentially constant. To this end, it is proposed to compensate for an incomplete but continuously increasing filling of the reservoir with combustible gas by a timewise longer combustible gas injection or, if no such time is available (for example the motor is already running at the desired speed) the missing gas volume is compensated for by an additional injection of liquid fuel.

A switch-over between the first and the second operating mode is performed in reversed order (as will be explained below). The switch-over procedure however should be considered only up to partial engine load in order to avoid a noticeable load drop.

Before a switch-over of the blocking valve 87 to the first switching position, the liquid fuel supply pressure is increased (preferably starting from an ignition jet operating pressure of 600-1000 bar) to the maximum value (for example 2500 bar) in order to facilitate a rapid filling switch-over of the injection reservoir 55 during the change-over of the injector operating mode. With the switch-over of the blocking valve 87, the combustion gas supply to the nozzle chamber 13 of the first injector unit 3 is interrupted. Furthermore, the valve 85 is returned to the first switching position by a pressure reduction at the control side 95 so that the second reservoir side 65 is again in communication with the second high pressure supply path 25 for supplying liquid fuel to the reservoir 55. As a result, the combustible gas is pushed out of the reservoir 55 via the inlet 61 into the first high pressure supply path 11 and the injector reservoir is fully filled with liquid fuel. As soon as the injector reservoir 55 is filled with liquid fuel, the injection pressure at the second injector unit is again increased so that the injection operation in the second injector operating mode can now continue under the normal injection parameters.

With the switch-over of the blocking valve 87 to the first switching position, the liquid fuel injection volume is increased to the design injection volume, in particular without any delay so as to compensate for the now interrupted supply of combustible gas by the closing of the high pressure supply path 11. This can still be achieved by an increase of the injection period.

Figure 3:
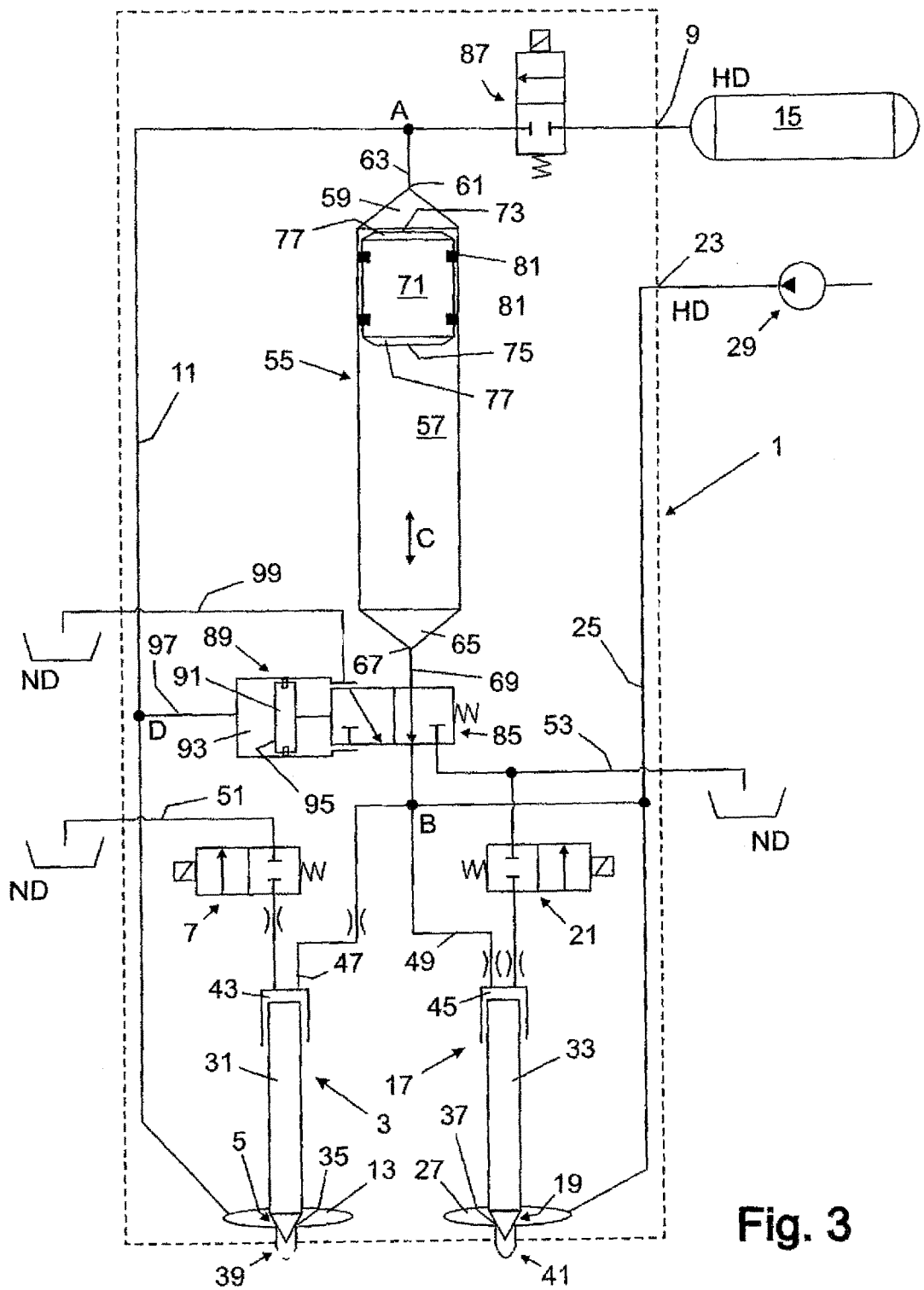

FIG. 3 shows a further arrangement of the dual-fuel fuel injector 1 similar to that of FIG. 2 wherein, other than in the embodiment of FIG. 2, the blocking valve 87 is arranged upstream of the connecting point A in the first high pressure supply path 11. With this arrangement, a switch over procedure from the first to the second injector operating mode analog to the explanation given above in connection with the FIG. 2 embodiment is provided, wherein however, the first main fuel that is the combustible gas left in the injector reservoir is used in the switch-over process during the mixed gas-Diesel fuel operation. This is advantageous in so far as the liquid fuel injection volume can be better adjusted. The combustible gas pressure remains the same or increases slightly during the re-filling phase of the injector reservoir with liquid fuel. Advantageously, with the utilization of the residual gas, the switch-over phase can be smoothened out or it can be performed also at higher engine loads or even at full engine load.

In the embodiment of FIG. 3, the arrangement of the shut-off valve 87 ahead of the connection point A forms at the same time a safety arrangement since the shut-off valve is suitable to switch off the first injector unit 3 including the combustible gas side 59 of the injector reservoir 55. In this regard, the shut-off valve 87 may also be a control valve with a (flow-controlling) volume-limiting function (that is, it may be a flow volume limiting) valve.

Finally, it is pointed out that, with the present invention, a switch-over between the injector operating modes may also be performed during full-load operation if it is made sure that the two injector units 3, 17 together can always inject more than the required full-load energy. Herein the combustion may not be optimal over several operating cycles but this could be acceptable as a compromise. The switch-over duration with a high speed Diesel engine may be for example 3-5 seconds.

What is claimed is:

1. A dual-fuel fuel injector (1), comprising:
   a first injector unit (3) for a first injector operating mode with a first main fuel,
   a second injector unit (17) for a second injector operating mode with a second main fuel,
   an injector reservoir (55), and
   a switching arrangement for filling the injector reservoir (55), depending on a respective selected injector operating mode, with either one of the first main fuel or the second main fuel.

2. The dual-fuel fuel injector (1) according to claim 1, wherein the dual-fuel fuel injector (1) is designed to fill the injector reservoir (55) for the first injector operating mode with the first main fuel and for the second injector operating mode with the second main fuel.

3. The dual-fuel fuel injector (1) according to claim 1, wherein the first injector unit (3) has a first nozzle chamber (13) and the second injector unit (17) has a second nozzle chamber (27) and the dual-fuel fuel injector (1) is adapted to place in the first injector operating mode the first nozzle chamber (13) in communication with the injector reservoir (55) and, in the second injector operating mode, place the second nozzle chamber (27) in communication with the injector reservoir (55).

4. The dual-fuel fuel injector (1) according to claim 3, wherein the dual-fuel fuel injector (1) is adapted to displace during a transition from the first operating mode to the second operating mode the first main fuel of the first injector operating mode from the fuel injector reservoir (55) and fill the injector reservoir (55) with the second main fuel of the second injector operating mode, and, during a transition from the second injector operating mode to the first injector operating mode, to displace the second main fuel of the second injector operating mode from the injector reservoir (55) and fill the injector reservoir (55) with the first main fuel of the first injector operating mode.

5. The dual-fuel fuel injector (1) according to claim 1, wherein the injector reservoir (55) has a first side (59) with an inlet (61) for the first main fuel, a second side (65) with an inlet (67) for the second main fuel, and a separating element (71) is movably disposed in the injector reservoir (55) so as to separate the first side (59) of the injector reservoir (55) from the second side (65).

6. The dual-fuel fuel injector (1) according to claim 5, wherein the dual-fuel fuel injector (1) is adapted to displace selectively the first main fuel or the second main fuel from the injector reservoir (55) by moving the separating element (71) selectively toward a respective end of the injector reservoir (55) depending on the respective selected injector operating mode.

7. The dual-fuel fuel injector (1) according to claim 5, wherein the separating element (71) has a first end position (61) in which it blocks the inlet (61) for the first main fuel and a second end position in which it blocks the inlet (67) for the second main fuel.

8. The dual-fuel fuel injector (1) according to claim 5, wherein the dual-fuel fuel injector (1) is adapted to place, for the first injector operating mode, the inlet (61) of the injector reservoir (55) for the first main fuel in communication with a first high pressure supply path (11) and a nozzle chamber (13) of the first injector unit (3) and, for the second injector operating mode, place the inlet (67) of the injector reservoir (55) for the second main fuel in communication with a second high pressure supply path (25) of the dual-fuel fuel injector (1) and a nozzle chamber (27) of the second injector unit (17).

9. The dual-fuel fuel injector (1) according to claim 8, wherein the dual-fuel fuel injector (1) is adapted to release the first main fuel from the second side (65) of the injection reservoir (55) for operation in the first injector operating mode and release the second main fuel from the first side (59) of the injector reservoir (55) for operation in the second injector operating mode.

10. The dual-fuel fuel injector (1) according to claim 1, wherein the dual-fuel fuel injector (1) is adapted to fill the injector reservoir (55) in correspondence with the respective selected injector operating mode either with the first main fuel or the second main fuel by a control of respective main fuel supply pressures.

11. A dual-fuel fuel injection system comprising the dual-fuel fuel injector according to claim 1.

12. The dual-fuel fuel injection system according to claim 11, wherein the dual-fuel fuel injection system is designed for controlling a filling switch-over of the injector reservoir (55) during switch-over between the first injector operating mode and the second injector operating mode.

13. The dual-fuel fuel injection system according to claim 11, wherein the dual-fuel fuel injection system is adapted to control the switchover arrangement (85, 87) so as to fill the injector reservoir (55) in correspondence with the respective selected injector operating mode either with the first main fuel or the second main fuel by a control of respective main fuel supply pressures.

14. The dual-fuel fuel injection system according to claim 13, wherein any energy amount provided for respective injection events during switch-over between the injector operating modes is kept unchanged by a predetermined transition strategy.

15. A combustion engine comprising at least one dual-fuel fuel injector (1) according to claim 1.

* * * * *

UNITED STATES PATENT AND TRADEMARK OFFICE
CERTIFICATE OF CORRECTION

PATENT NO. : 10,197,027 B2
APPLICATION NO. : 15/485310
DATED : February 5, 2019
INVENTOR(S) : Markus Kalenborn It is certified that error appears in the above-identified patent and that said Letters Patent is hereby corrected as shown below:

In the Specification

Column 5, Line 67, please replace "that is;" with -- that is, --.

Column 8, Line 22, before "in" please insert -- 71 --.

Column 9, Line 23, after "73," please insert -- 75 --.

Column 9, Line 36, please replace "inject or" with -- injector --.

Signed and Sealed this
Twenty-first Day of May, 2019

Andrei Iancu
*Director of the United States Patent and Trademark Office*